United States Patent [19]

Stone

[11] 3,731,812
[45] *May 8, 1973

[54] DOMESTIC SEWAGE TREATMENT PLANT

[75] Inventor: James S. Stone, Wheat Ridge, Colo.

[73] Assignee: Sanitary Disposal Systems, Inc., Wheat Ridge, Colo.

[ * ] Notice: The portion of the term of this patent subsequent to Mar. 31, 1987, has been disclaimed.

[22] Filed: Feb. 25, 1970

[21] Appl. No.: 1,052

Related U.S. Application Data

[63] Continuation-in-part of Ser. No. 771,672, Oct. 29, 1968, Pat. No. 3,503,876.

[52] U.S. Cl. .................. 210/199, 210/15, 210/203, 210/220
[51] Int. Cl. .................................................. C02c 1/12

[58] Field of Search .................. 210/14.15, 199, 220, 210/203, 221, 197, 203, 7

[56] References Cited

UNITED STATES PATENTS 3,503,876   3/1970   Stone ..................................... 210/7

Primary Examiner—Reuben Friedman
Assistant Examiner—Thomas G. Wyse
Attorney—Anderson, Spangler & Wymore

[57] ABSTRACT

A tertiary treatment domestic sewage treatment plant effecting particle size reduction by hydraulic action, utilizing extended aeration and adiabatic cooling of the surface of the treating bath to enhance oxygen absorption and being provided with a living filter.

26 Claims, 7 Drawing Figures

Patented May 8, 1973

INVENTOR.
JAMES S. STONE
BY
Anderson, Spangler & Wymore
ATTORNEYS

Patented May 8, 1973
3,731,812
3 Sheets-Sheet 2
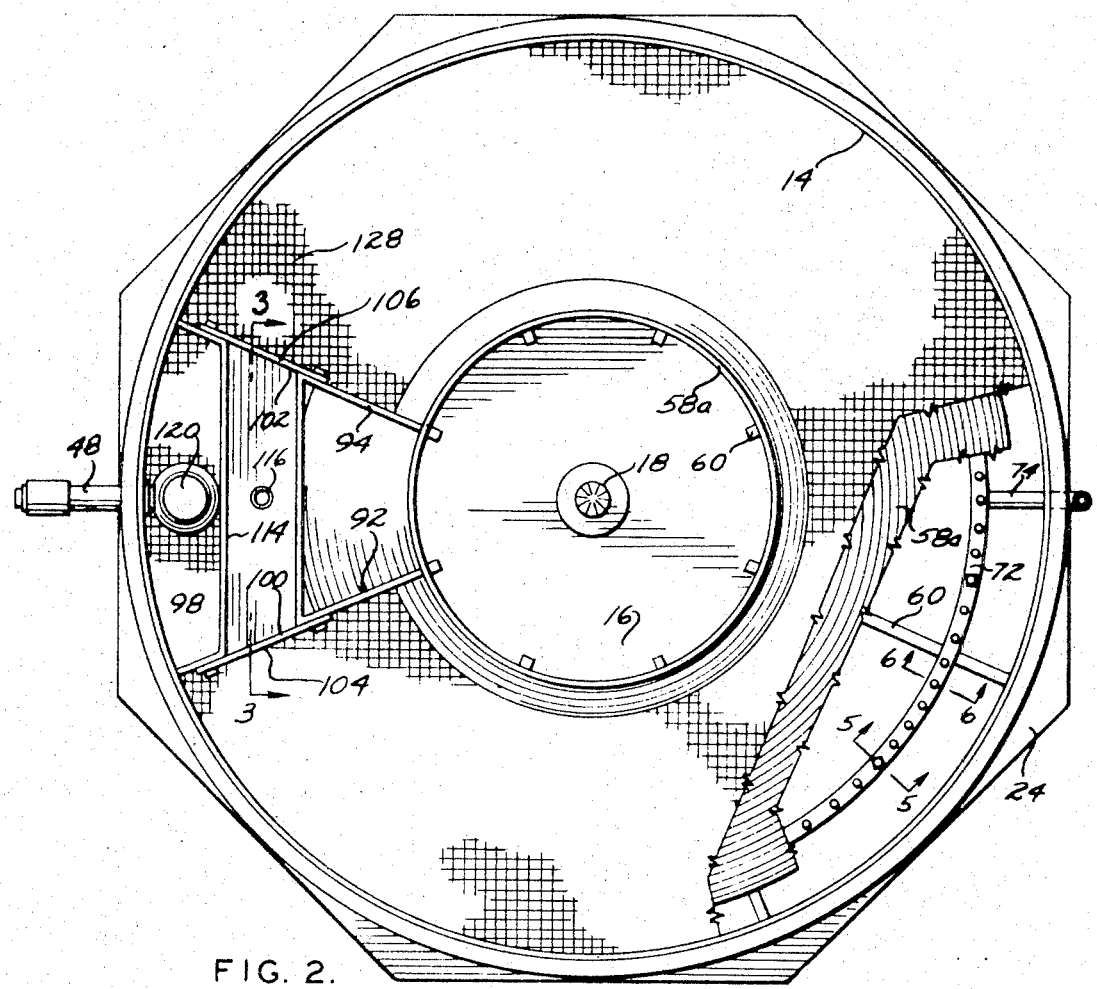
FIG. 2.
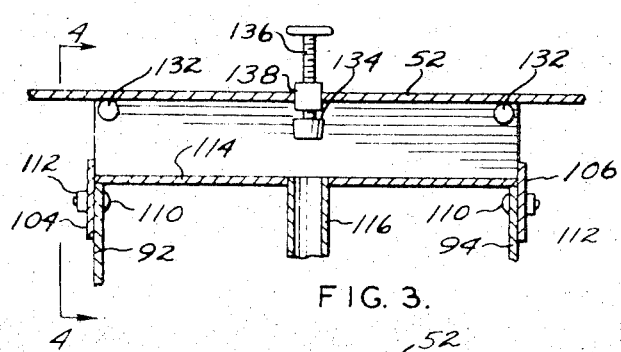
FIG. 3.
FIG. 4.
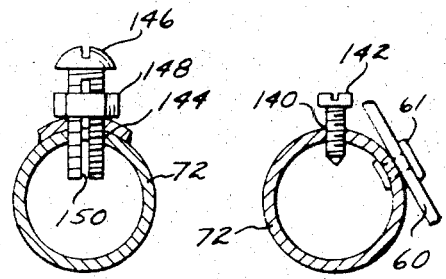
FIG. 5.  FIG. 6.
INVENTOR.
JAMES S. STONE
BY
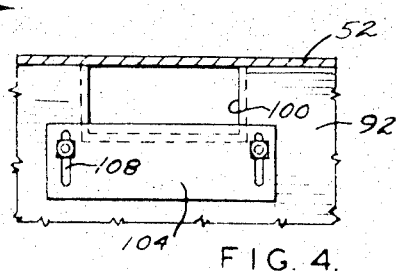
ATTORNEYS

INVENTOR
JAMES S. STONE

DOMESTIC SEWAGE TREATMENT PLANT

This application is a continuation-in-part of my application for U.S. Letters Patent Ser. No. 771,672 filed Oct. 29, 1968, for "DOMESTIC SEWAGE TREATMENT PLANT" issued Mar. 31, 1970, as U.S. Pat. No. 3,503,876.

Sewage is a continuously variable conglomeration collected from many miles and from many sources. It arrives at the sewage treating plant in all degrees of decomposition, dilution and chemical contamination. The primary treatment in the usual municipal plant is to separate the solids by screening and sedimentation. The separated solids are usually disposed of by incineration or by being used as land fill. The next step is to remove colloidal and dissolved solids from the liquid. This may be accomplished by introducing the liquid to microbes, as in a trickling filter, or introducing microbes to the liquid in the form of an activated sludge. In each case, the microbes adsorb and absorb volatile solids and are then separated from the liquid by sedimentation. The effluent is then chlorinated to chemically stabilize many variables and to kill all pathogenic organisms. Due to the large flow volume, chemical complexity, time element and economics, the microbes are used primarily only to collect and settle suspended solids rather than converting all volatile matter to simple and stable compounds that can be returned to the natural biological cycle.

The use of anaerobic bacteria creates large volumes of sludge and odorous gases. Also, sedimentation is not always the most satisfactory procedure unless the material is completely inert. When organic matter settles, it soon suffocates itself and turns septic, wherein only anaerobic bacteria can survive. The standard septic tank is an anaerobic process wherein only about 35 percent of the sewage is decomposed within the tank compared to the decomposition of 95 percent and better within the tank using the process of this invention. A particular problem with other aerobic processes, especially small "packaged" plants, is that floc rises to the surface, due to hydraulic displacement and gasification in the various stages of decomposition. This floc is basically a gelatinous mass of microbe colonies with a large amount of organic matter absorbed and adsorbed into the mass. The surface of the aerobic section will collect floc, and when the surface then dries, it becomes an excellent breeding ground for flies and mosquitoes. Thus, this health hazard is greater than the potential hazard of pathogenic bacteria in the effluent, even without chlorination.

It is the principal object of the present invention to provide an improved domestic sewage treatment plant which avoids one or more of the disadvantages of the prior art arrangements and which has improved efficiency.

It is a further object of this invention to provide an improved domestic sewage treatment plant and method which avoids long and oversized transmission lines.

A further object of this invention is to provide an improved domestic sewage treatment which uses hydraulic action to reduce particle size of the sewage, provides extended aeration with enhanced oxygen absorption and an efficient air-lift transfer pump which requires minimum maintenance and operating costs.

A further object of this invention is to provide an improved sewage treating plant which will automatically and continuously break up floc that forms from settled sludge that rises to the surface and redistributes the broken floc by continuous circulation.

Another object of the present invention is to provide an improved domestic sewage treating plant which provides tertiary treatment of the sewage, including hydraulic breakdown of the sewage, extended aeration and adiobatic cooling of the surface of the treating bath and the use of a living filter of microbes.

Another object of the invention is to provide an improved sewage treating plant which provides total mixing of oxygen, raw sewage and activated sludge automatically and continuously with maximum interface contact area, provides ease of filter maintenance by simple backwashing, provides for sterilization of the effluent, provides final filtering of suspended solids and periodic metered discharge of the effluent in regulated quantities.

For a better understanding of the present invention, together with other and further objects thereof, reference is had to the following description taken in connection with the accompanying drawings and its scope will be pointed out in the appended claims.

In the drawing:

FIG. 2 is a plan view thereof with the top removed and portions broken away to show detail;

FIG. 3 is a view in cross section to an enlarged scale of the effluent overflow weir trough and back flush valve;

FIG. 4 is a View along line 4—4 of FIG. 3;

FIG. 5 is a view along line 5—5 of FIG. 2;

FIG. 6 is a view along line 6—6 of FIG. 2; and

Figure 1:
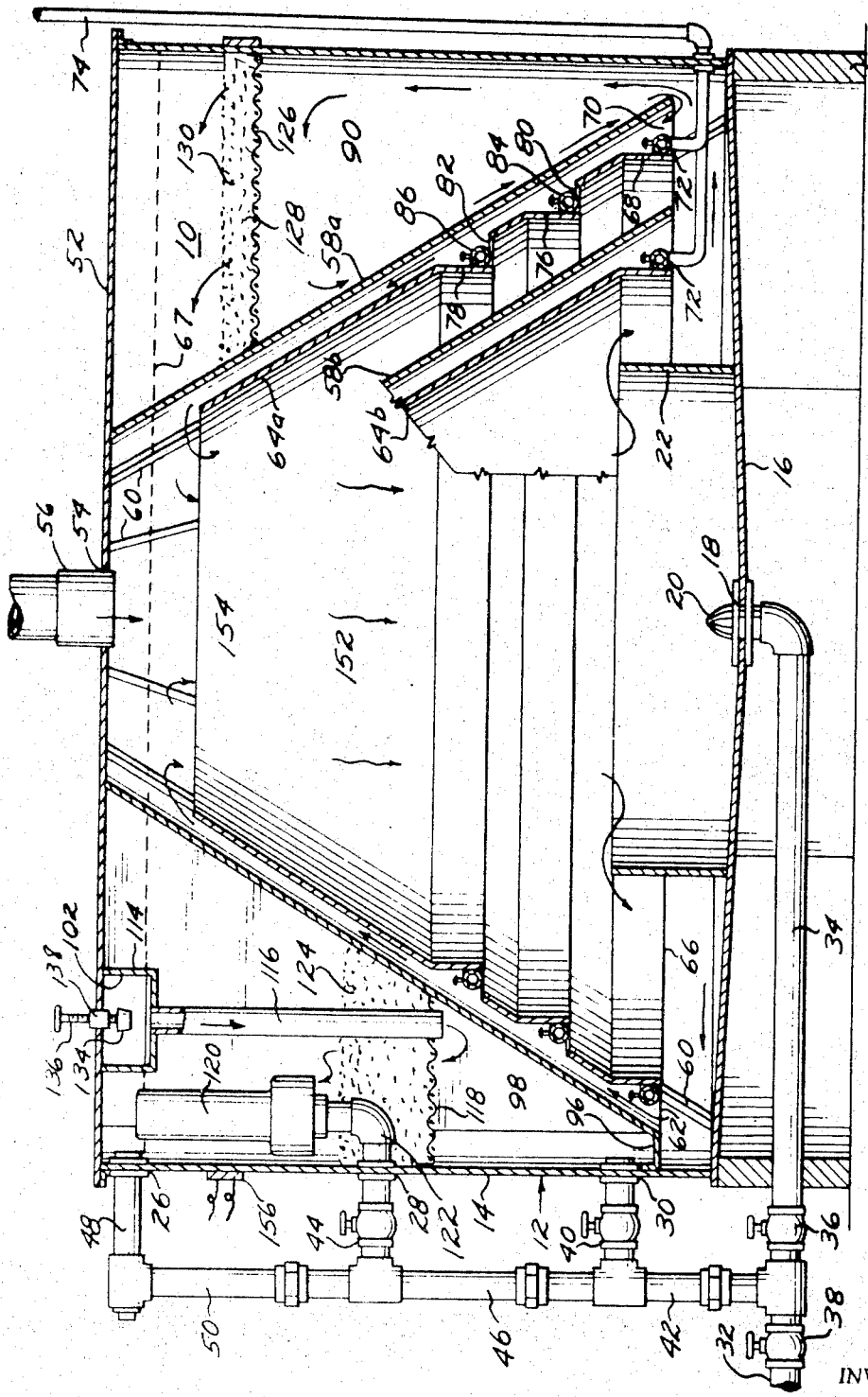
FIG. 1 is a cross section view in elevation of the domestic sewage treating plant according to the present invention with portions broken away for clarity.

Referring now to FIG. 1, the domestic treating plant is generally identified by reference numeral 10. The plant is seen to be contained within a tank 12 of suitable non-corrosive material. Tank 12 is provided with side walls 14 which may suitably be of circular configuration and a bottom 16. The bottom 16 is provided with a centrally positioned outlet 18 having a suitable grating 20. Bottom 16 may be provided with a gentle slope toward outlet 18. Positioned concentrically with outlet 18 is an upstanding annular wall 22 providing a circular baffle about outlet 18. Bottom 16 of tank 12 is supported upon a suitable foundation 24. Side walls 14 of tank 12 may be gently sloping toward the bottom 16 and are provided with several openings 26, 28 and 30. These openings, along with opening 18, are connected to a suitable drain pipe 32 for disposal. Opening 18 is connected to pipe 32 via pipe 34, valve 36 and valve 38. Opening 30 is connected to pipe 32 via valve 40, pipe 42 and valve 38. Opening 28 is connected to pipe 32 via valve 44, pipe 46, pipe 42 and valve 38. Opening 26 is connected to pipe 32 via pipe 48, pipe 50, pipe 46, pipe 42 and valve 38. Tank 12 is provided with a top 52 removably secured to the side walls 14 by suitable means (not shown). Top 52 is provided with a central inlet opening 54 having raw sewage inlet conduit 56 connected thereto.

A truncated conical baffle 64a is supported in concentric relation to the tank side walls within tank 12 with the smaller diameter end of the top and the larger diameter end spaced from the bottom 16 and side walls 14. A plurality of vertically positioned L-shaped ribs 60 are provided of a length to reach the top 52 and extend beyond the bottom edge 66 of baffle cone 64a into contact with bottom 16 where they are secured in position by suitable means. The horizontal leg of the L-shaped ribs is positioned in contact with cone 64a which is fastened thereto by suitable means. An outer truncated cone baffle 58a is positioned outside cone 64a and supported by ribs 60 in spaced relation to cone 64a. The bottom edge 62 of cone 58a is coextensive with the bottom edge of cone 64a while the upper edge of cone 58a extends above the normal liquid level of the tank and may contact top 52. The upper edge of cone 64a stops short of the normal liquid level 67 and is spaced from top 52. For a short distance from the bottom edge 66 of cone 64a, a section 68 of the baffle wall is vertically positioned as by bending inwardly and the like to produce a flared opening 70 between the bottom portions of cones 58a and 64a. Secured near the lower edge of the vertical section 68 of cone 64a is an air inlet and distribution pipe 72 which may be attached to the horizontal leg of ribs 60 as by rivets 61. As best seen in FIG. 2, pipe 72 is of circular configuration of a size to be positioned in the annular space between cones 58a and 64a. Distribution pipe 72 is connected to an air supply pipe 74 which is connected to a suitable supply of air under pressure, not shown. Pipe 72 may suitably be of a plastic adapted to withstand the pressures normally encountered, i.e., about 20–25 psi absolute. Cone 64a may be provided with additional annular openings 80 and 82 therein adjacent vertical portions as at 76 and 78, and additional air inlet and distribution pipes 84 and 86 may be positioned in the annular space between cones 58a and 64a adjacent vertical portions 76 and 78 and be connected to air supply line 74 and to the supply of air under pressure. It will be noted that the upper edge of upstanding baffle 22 extends above the lower edges of baffle cones 58a and 64a. It will further be noted that a vertical line drawn through the point of intersection of the normal liquid level 67 with cone 58a falls inside the top opening of baffle 64a for the reasons to be explained as the description progresses.

The V-shaped annular space 90 between walls 14 of the tank and cone baffle 58a is interrupted by two radially extending walls 92 and 94 which, with bottom wall 96, form an overflow chamber 98. Walls 92 and 94 extend from the bottom edge of cone baffle 58a to the top thereof in contact with top 52. A pair of weir openings 100 and 102 are respectively positioned in the upper part of walls 92 and 94. Adjustable weir gates 104 and 106 are positioned to provide a selectively adjustable closure for weir openings 100 and 102. Weir gates 104 and 106 are provided with vertical slots 108 to receive bolts 110 attached to walls 92 and 94. Nuts 112 are tightened thereon to hold the weir gates in place. Weir gates 104 and 106 are adjustable to provide an adjustable water level which directly controls the circulation rate of the air-lift pump formed by the annular space between cones 58a and 64a and air issuing from air distribution pipe 72. The raising and lowering of the gate raises and lowers the circulation rate respectively. An overflow weir trough 114 extends between walls 92 and 94 in communication with weir openings 100 and 102. A down comer 116 descends from the bottom of trough 114 and extends to a position below screen 118 which extends between walls 92 and 94, cone baffle 58a and side wall 14. The discharge from weir tough 114 passes through down comer 116 into a chamber 98 formed by walls 92, 94 and 14, baffle 58a and bottom wall 96. Chamber 98 serves as a contact tank for exposure of the effluent to chlorine or potassium permanganate. The overflow from chamber 98 is provided with a discharge valve 120 connected by pipe 122 through opening 28 to valve 44. Discharge valve 120 operates on the principle of a siphon and on the level of the effluent in chamber 98 reaching a predetermined level as illustrated by dotted line 67, the valve will rapidly discharge effluent to a lower predetermined level which is normally above the upper surface of the filter bed 124. Valve 40 is normally closed.

Extending around the tank below the normal liquid level 67 and supported between wall 14 and baffle 58a is the support screen 126 for the living or biological filter 128. The screen 126 extends from wall 92 around tank 12 to wall 94. A layer 130 of porous rock particles serves as a support for the organisms forming the filter. One or more sources 132 of intense ultra-violet light may be supported by the top 52 and positioned above weir trough 114 to apply ultra-violet radiation to the effluent from tank 12. A stopper 134 having a threaded stem 136 threadably received in a nut 138 secured to top 52 is positioned to be selectively received in the top of down comer 116 for backwashing the tank 98. The filter media 130 is backwashed during a "no-flow" period by hosing water from the top downward and allowing the solids to settle to the bottom periphery of cone 58a where they are pumped into the inner section 152.

As best seen in FIGS. 5 and 6, the air distribution pipe 72 is provided with a plurality of spaced adjustable openings for introduction of air into the system from supply line 74. The pipe 72 is circular in configuration forming an air ring. Referring to FIGS. 2 and 6, it is seen that a plurality of openings 140 are provided in pipe 72 which may be of plastic. A loose fitting screw 142 is positioned in opening 140 and the fit is such as to provide an escape path for a small stream of air. Spaced at larger intervals around pipe 72 are a plurality of larger openings 144. Openings 144 threadably receive a bolt 146 provided with an adjusting nut 148. Bolt 146 is provided with a longitudinal slot 150 which provides an adjustable sized passageway for the escape of air from pipe 72. The size of the passageway and the rate of air injection is controlled by screwing bolt 146 in or out and securing by nut 148.

The sewage treatment plant of this invention will process the domestic sewage from an individual residence, apartment building and the like in order to control the quality of the effluent. The pollution of underground water and streams by effluent from anaerobic septic tank systems or "privies" is avoided. Long and oversized transmission lines are avoided with the present invention. Long and oversized lines required with prior art devices are prone to allow sewage to decompose, with the evolution of hydrogen-sulfide, methane and other odorous and toxic gases. Hydrogensulfide also forms acids in the crown of all sewer lines which is toxic to the biological organisms used in the plant. The acids also attack pipe joints, resulting in the seepage of sewage contaminated with pathogenic viruses and bacteria into the ground waters. This is one of the most serious health hazards because of the great possibility of the return of these pathogens to a water supply and human consumption. These pathogens are extremely vulnerable to time in an alien environment; therefore, higher overall health standards can be maintained by processing them quickly. The present invention preferably also avoids the use of copper plumbing because of the high rate of corrosion, the products of which are toxic to the organisms in the plant.

To start up the sewage plant, influent of human feces is allowed to be discharged into the plant, through influent pipe 56. The tank is filled with water to a level of dotted line 67 with the porous rock 130 being positioned on screen 126 to form filter 128 and a layer of sand positioned on screen 118 to provide a polishing filter. The influent is allowed to accumulate for several days to build up a working charge. The influent is fed into the apex end of cone baffle 64a. Compressed air at a pressure on the order of about 1 to 3 pounds per square inch gauge is fed into line 74 and through air distribution pipe 72. The air bubbles discharge into the annular space between cone baffles 58a and 64a. Additional pairs of baffle cones 58b and 64b may be provided to terminate short of top 52 and below level 67. A further air distribution ring 72 is then provided to discharge air bubbles therebetween. In addition, series air distribution rings 84 and 86 may be provided to discharge air bubbles through openings 80 and 82 in baffle 64a. The discharge of air bubbles into the space 70 between the baffles causes the upward movement of air and liquid in the manner of an air-lift pump. Further influent is discharged from pipe 56 into a zone 152 of high hydraulic turbulence to effect size reduction of solids and mix mixrobes and dissolved oxygen with the fresh sewage.

The hydraulic action in zone 152 is accomplished by the air-lift pump action of the diffused air from air ring 72. The pump discharges from the top of the annular space between two cone baffles 64a and 58a. The discharge flow converges in a small circle with a downward thrust, forcing the liquid to fan out across the bottom of the tank toward the periphery of the tank. The upstanding baffle 22 serves to trap and hold some of the solids which settle to the bottom. These solids are subjected to continuous erosion by the downward thrust from the liquid convergent zone 154 directly above. Other but lighter large solids lose their downward momentum and float upward along the inner surface thereof to the liquid convergent zone 154 at the top. The downward thrust of the hydraulic action and rise of large solids continues until the size of the solids is reduced sufficiently to maintain its momentum and escape the inner cone under the bottom periphery. The escaping solids either pass up between the cones for recirculation or pass into the quiescent zone 90. In zone 90, the solids rise toward the biological filter 128. Those particles passing up between the cones are reaerated by diffused air bubbles and mixed with fresh influent. The downward thrust of the liquid convergent zone 154 also increases the rate of solution of oxygen by retention of the air bubbles below the surface for extended periods of time due to the continuous pelting from the new bubbles being introduced from above. The air bubbles are driven to the bottom of the tank and held in zone 152 with considerable turbulence, which accounts for the unusually high oxygen absorption efficiency of the design of the present invention. The cycle is continuous and functions as a highly efficient aerobic bacteria digestion process. The aerobic saprophytic bacteria and protozoa are prolific in this environment since matter toxic to these organisms has been minimized; the organic matter has been finely divided and is maintained in suspension by hydraulic action; and an abundant supply of dissolved oxygen is furnished by diffused bubble aeration with rapid and continuous circulation.

The water temperature in the sewage plant is maintained relatively stable and is approximately at the dew point temperature of the ambient air due to adiabatic cooling at the surface of the liquid convergent zone 154. The lower water temperature and vigorous surface agitation permit increased amounts of oxygen to be absorbed, thus producing a more alien environment to kill parasitic bacteria that may be pathogenic.

The hydraulic displacement causes an upward current in the quiescent zone 90 between the wall 14 and the outer conical baffle 58a. The nuclei of organic matter, with myriads of bacteria and protozoa and other suspended and dissolved solids that escape the air-lift pump intake 70, are carried upward to the biological filter 128. The upward velocity of the current is reduced in ascension due to the greater cross sectional area at the filter. The reduction of upward current velocity promotes the settling of solids that slough off of the filter and the adsorption with solids tending to rise.

Filter 128 differs significantly from the usual trickling filter in that the flow is reversed, the flow passages are considerably smaller and it is completely submerged. The filter is a zoogleal mass, composed of aerobic saprophytic bacteria, fungi, algae, protozoa, Crustaceae, Rotifera and worms. This mass of organisms thrives as a natural ecological succession with a controlled environment. The mass is held submerged by the supporting geo-rock 130 in its natural watery media to eliminate drying and insect nuisance. Further, the hydraulic displacement, from below, furnishes food as finely divided suspended, colloidal and dissolved solids. Continuous aeration from below furnishes dissolved oxygen to assure a completely aerobic process for an odorless operation.

The upward flow of water through zone 90 and filter 128 allows the waste matter, including carbon dioxide, unbound water, mineral salts, dead cells and other inorganic matter all to be displaced. The displaced water flows into weir trough 114, and passes through a disinfection chamber 98 before being discharged as a clear and sanitary effluent. An optimum temperature is maintained in the filter zone by an electrical heating element 156 around the outside of tank 12 controlled by an Aquastat. The circular configuration of the filter provides maximum growth area per unit load. The circular configuration of the filter surface assures maximum sedimentation and minimum turbulence during the hydraulic displacement and discharge from the filter. The central influent of material to be treated and the peripheral effluent zone provide uniform circulation and distribution of solids, thus avoiding short-circuiting or channeling problems.

The disinfection operation could involve any one of several processes or a combination. A high intensity, short wave, ultra-violet source 132 could be installed directly above each overflow weir with the water flowing uniformly over the weir in a thin sheet. The water would stay in the trough 114 until the level was high enough for discharge by an automatic siphon valve or float actuated pump, not shown.

A longer ultra-violet exposure could be obtained by flowing the water from the weir trough into a peripheral trough. The water flow would travel around the entire circumference of the tank and a greater volume of water would be retained for a longer period of time. Additional ultra-violet lamps would be positioned above the peripheral trough.

The discharge from the weir trough would flow into a contact tank 98 for exposure to chlorine or potassium permanganate. The chlorine feeder is a porous wick inserted inside a small plastic tube to provide resistance to flow and capillary action without evaporation. One end of the tube and wick is inserted, gas-tight, into a plastic bottle of chlorine solution. The bottle is positioned close to a heat source, such as the compressor motor, so that the heat therefrom can be utilized to raise the vapor pressure of the chlorine solution and force a very small quantity of vapor through the wick. The exposed tip of the wick is inserted in tube 116 below the liquid surface. The prior art drip mechanism or metering pump is subject to clogging and uses more chlorine than is necessary, even with the smallest adjustment. While it is doubtful that E-coli bacteria could survive the relatively low temperature and high aeration rate of the cone baffles, the ravenous protozoa in the filter 128 and the relatively long retention time in a completely alien environment, the disinfection process is necessary to render the effluent potable.

The sewage plant of this invention can be buried or installed in the crawl space or basement of a standard residence or commercial building. The tank could be closed as by means of top 52 and vented through the influent pipe 56. The effluent may be used to water a lawn or re-used as a secondary water supply to flush toilets, equipment cooling functions or wasted in a storm drain. The plant could be incorporated into a fish pond for a botanical or hydroponic garden. The microbes would serve as fish food and the effluent disposed of by plant transpiration. An outdoor application would normally accelerate the growth of algae due to photosynthesis and might have to be removed periodically; however, inherent design features limit the growth of algae. The high ratio of microbes to organic matter and the continuous aeration removes over 90 percent of the phosphates which are the food supply for algae. A moderate algae growth is desirable because it absorbs carbon dioxide and evolves oxygen. The algae also assists in the chemical decomposition of complex compounds. Winter freezing and slow down of biological activity is eliminated by covering the pond with a transparent plastic bubble inflated by spent air used for aeration.

About 80 percent of the material treated is organic matter and is converted to carbon dioxide and water in the plant. The balance is inorganic matter which is found in the skeletal structure of organisms in the filter 128 which ultimately passes off in the effluent and grit and mineral salts which accumulate in a very small amount on the floor of the tank.

The performance specifications for a representative sewage treating plant according to the present invention for domestic sewage for six people requires a tank capacity of about 625 gallons plus 3 inches of freeboard. The activation, size reduction and aeration zone 152 has a volume of 200 gallons with a BOD loading of 50 lb. BOD/1,000 CF with continuous aeration. The air supply required is 12 hours at 84 CFH and 12 hours at 168 CFH or 3,000 CF/lb. 5 day BOD. Power required is about 3 KWH per day. The volume of the clarifier and biological filter zone 128 is about 400 gallons with a BOD loading of 13 lb. BOD/MCF with the filter 128 having a loading of 430 BOD/MCF. The rise rate is approximately from 11 to 130 gallons/SF day with the weir overflow rate being about 3,000 gallons/linear foot-day. The disinfecting and polishing zone 98 has a volume of about 40 gallons. Detention time with chlorination is from ½ to 1½ hours. Exposure time with ultra-violet lights is about one-half second. Maximum coliform organisms is about 1,000 MPH/ML. The filter loading the settleable solids is about 0.5 ML/L while suspended solids is about 75 ML/L. The rise rate is about 135–140 gallons/SF day. The effluent discharge rate is about 20 gallons/minute with the quality being clear and odorless with approximately 4 PPM minimum dissolved oxygen. The oxygen absorption, circulation rate, turbulence and downward thrust is increased with the use of multiple air rings and/or multiple cone baffles.

Where removal of accumulated solids from the bottom of tank 12 is required, this may be accomplished via the bottom drain 20 and pipe 34. Pipe 34 serves to establish liquid level 67.

Figure 7:
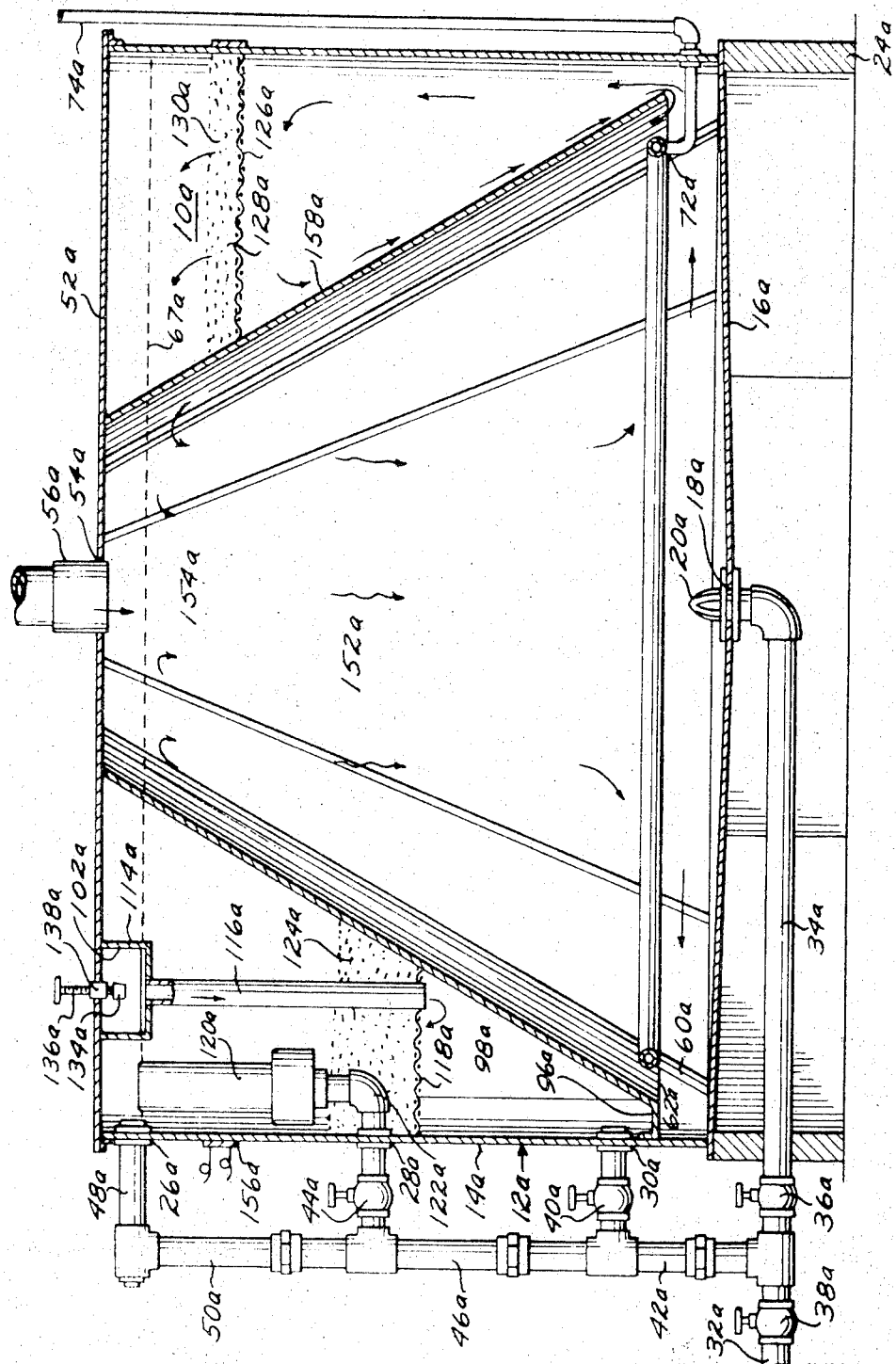
FIG. 7 is a cross section view in elevation of a modified embodiment of the domestic sewage treating plant according to the present invention.

Referring now to FIG. 7 there is shown a simplified embodiment of the treating plant of the invention which is generally referred to by reference numeral 10a. The plant may be conveniently positioned within a tank 12a of suitable non-corrosive material. Tank 12a has side walls 14a which may suitably be of circular configuration and a bottom 16a. The bottom is provided with a centrally positioned outlet 18a having a grating 20a. Bottom 16a of tank 12a is supported upon a suitable foundation 24a. Side walls 14a of tank 12a may be gently slopping toward the bottom 16 and are provided with a plurality of openings 26a, 28a and 30a. These openings, along with opening 18a, are connected to a suitable drain pipe 32a for disposal. Opening 18a is connected to pipe 32a via pipe 34a, valve 36a and valve 38a. Opening 30a is connected to pipe 32a via valve 40a, pipe 42a and valve 38a. Opening 28a is connected to pipe 32a via valve 44a, pipe 46a, pipe 42a and valve 38a. Opening 26a is connected to pipe 32a via pipe 48a, pipe 50a, pipe 46a and valve 38a. Tank 12a is provided with a top 52a removably secured to the side walls 14a by suitable means (not shown). Top 52a is provided with a central inlet opening having raw sewage inlet conduit 56a connected thereto.

A truncated conical baffle 158a is supported in concentric relation to the tank sidewalls 14a within tank 12a with the smaller diameter end at the top and the larger diameter end being spaced from the bottom 16a and side walls 14a. A plurality of vertically positioned L-shaped ribs 60a are provided of a length to reach the top 52a and extend beyond the bottom edge 66a of the baffle cone 158a into contact with bottom 16a where they are secured in position by suitable means. The vertical leg of the L-shaped ribs is positioned in contact with cone 158a which is fastened thereto by suitable means. The upper edge of cone 158a extends above the normal liquid level of the tank 14a, and may contact top 152a. Secured near the bottom edge of cone 158a and spaced radially inwardly therefrom is an air inlet and distribution pipe 72a which may be fastened to cone 158a by suitable means. Distribution pipe 72a is connected to an air supply pipe 74a which is connected to a suitable supply of air under pressure, not shown. Pipe 72a may suitably be of a plastic adapted to withstand the pressures normally encountered, i.e., about 20–25 psi absolute.

The V-shaped annular space 90a between walls 14a of the tank and cone baffle 158a is interrupted by two radially extending walls 92a and 94a which with bottom wall 96a, form an overflow chamber 98a. Walls 92a and 94a extend from the bottom edge of cone baffle 158a to the top thereof in contact with top 52a. A pair of weir openings 100a and 102a are respectively positioned in the upper part of walls 92a and 94a. Adjustable weir gates 104a and 106a are positioned to provide a selectively adjustable closure for weir openings 100a and 102a. Weir gates 104a and 106a are provided with vertical slots 108a to receive bolts 110a attached to 92a and 94a. Nuts 112a are tightened thereon to hold the weir gates in place, Weir gates 104 and 106 are adjustable to provide an adjustable water level which directly controls the circulation rate of the air-lift pump action of air bubbles impinging beneath the inclinded wall portion of cone baffle 158a issuing from air distribution pipe 72a. The raising and lowering of the gate raises and lowers the circulation rate respectively. An overflow weir trough 114a extends between walls 92a and 94a in communication with weir openings 100a and 102a. A down comer 116a descends from the bottom of the trough 114a and extends to a position below screen 118a which extends between walls 92a and 94a, cone baffle 158a and side wall 14a. The discharge from weir trough 114a passes through down comer 116a into a chamber 98a formed by walls 92a, 94a and 14a, baffle 158a and bottom wall 96a. Chamber 98a serves as a contact tank for exposure of the effluent to chlorine or potassium permanganate. The overflow from chamber 98a is provided with a discharge valve 120a connected by pipe 122a through opening 28a to valve 44a. Discharge valve 120a operates on the principle of a siphon and on the level of the effluent in chamber 98a reaching a predetermined level as illustrated by dotted line 67a, the valve will rapidly discharge effluent to a lower predetermined level which is normally above the upper surface of the filter bed 124a. Valve 40a is normally closed.

Extending around the tank below the normal liquid level 67a and supported between wall 14a and baffle 158a is the support screen 126a for the living or biological filter 128a. The screen 126a extends from wall 92a around tank 12a to wall 94a. A layer 130a of porous rock particles serves as a support for the organisms forming the filter. One or more sources 132a of intense ultra-violet light may be supported by the top 52a and positioned above weir trough 114a to apply ultra-violet radiation to the effluent from tank 12a. A stopper 134a having a threaded stem 136a threadably received in a nut 138a secured to top 52a is positioned to be selectively received in the top of down comer 116a for back washing the tank 98a. The filter media 130a is backwashed during a "no-flow" period by hosing water from the top downward and allowing the solids to settle to the bottom periphery of cone 158a where they are pumped into the inner section 152a.

The plant will be started up in a manner similar to the plant of FIGS. 1 and 2 by allowing an influent of feces to be discharged into the plant, through inlet pipe 56a. The tank is filled with water to a level of the dotted line 67a with porous rock 130a being positioned on screen 126a to form filter 128. The influent is allowed to build up for several days. Compressed air at a pressure on the order of about 1 to 3 pounds per square inch gage is fed into line 74a and through air distribution pipe 72a. The air bubbles discharge into impingement with the inclined baffle 158a. The air bubbles are trapped beneath the inclined surface and in rising causes the upward movement of air and liquid in the manner of an air lift pump. Further influent is discharged from pipe 56a into zone 152a of high hydraulic turbulence to effect both size reduction of solids and mix microbes and dissolved oxygen with the fresh sewage.

The hydraulic action in zone 152a is accomplished by the air lift pump action of the diffused air from air ring 72a. The pump effectively discharges from the periphery of the top of zone 152a. Where the baffle 158a is conical, the discharge flow converges in a small circle with a downward thrust, forcing the liquid to fan out across the bottom of the tank toward the periphery of the tank. The heavier solids will settle to the bottom and be subjected to continuous errosion by the downward thrust from the liquid convergent zone 154a directly above. Other, but lighter large solids lose their downward momentum and float upward along the inclined surface of the baffle 158a to the liquid convergent zone 154a at the top. The downward thrust of the hydraulic action and rise of large solids continues until the size of the solids is reduced sufficiently to maintain its momentum and escape the inclined baffle under the bottom periphery. The escaping solids either pass up the underneath side of the inclined baffle 158a for recirculation or pass into the quiescent zone 90a. In zone 90a, the solids rise toward the biological filter 128a. Those particles passing up beneath the inclined baffle are re-aerated by diffused air bubbles and mixed with fresh influent. The downward thrust of the liquid convergent zone 154a also increases the rate of solution of oxygen by retention of the air bubbles below the surface for extended periods of time due to the continuous pelting from the new bubbles being introduced from above. The air bubbles are driven to the bottom of the tank and held in zone 152a with considerable turbulence, which accounts for the unusually high oxygen absorption efficiency of the design of the present invention. The cycle is continuous and functions as a highly efficient aerobic bacteria digestion process. The aerobic saprophytic bacteria and protozoa are prolific in this environment since matter toxic to these organisms has been minimized; the organic matter has been finely divided and is maintained in suspension by hydraulic action; and an abundant supply of dissolved oxygen is furnished by diffused bubble aeration with rapid and continuous circulation.

The water temperature in the sewage plant is maintained relatively stable and is approximately at the dew point temperature of the ambient air due to adiabatic cooling at the surface of the liquid convergent zone 154a. The lower water temperature and vigorous surface agitation permit increased amounts of oxygen to be absorbed, thus producing a more alien environment to kill parasitic bacteria that may be pathogenic.

The hydraulic displacement causes an upward current in the quiescent zone 90a between the wall 14a and the outer conical baffle 158a. The nuclei of organic matter, with myriads of bacteria and protozoa and other suspended and dissolved solids that escape the air-lift pump intake 70a, are carried upward to the biological filter 128a. The upward velocity of the current is reduced in ascension due to the greater cross sectional area at the filter. The reduction of upward current velocity promotes the settling of solids that slough off of the filter and the adsorption with solids tending to rise.

Filter 128a differs significantly from the usual trickling filter in that the flow is reversed, the flow passages are considerably smaller and it is completely submerged. The filter is a zoogleal mass, composed of aerobic saprophytic bacteria, fungi, algae, protozoa, Crustaceae, Rotifera and worms. This mass of organisms thrives as a natural ecological succession with a controlled environment. The mass is held submerged by the supporting geo-rock 130a in its natural watery media to eliminate drying and insect nuisance. Further, the hydraulic displacement, from below, furnishes food as finely divided suspended, colloidal and dissolved solids. Continuous aeration from below furnishes dissolved oxygen to assure a completely aerobic process for an odorless operation.

The upward flow of water through zone 90a and filter 128a allows the waste matter, including carbon dioxide, unbound water, mineral salts, dead cells and other inorganic matter all to be displaced. The displaced water flows into weir trough 114a, and passes through a disinfection chamber 98a before being discharged as a clear and sanitary effluent. An optimum temperature is maintained in the filter zone by an electrical heating element 156a around the outside of tank 12a controlled by an Aquastat. The circular configuration of the filter provides maximum growth area per unit load. The circular configuration of the filter surface assures maximum sedimentation and minimum turbulence during the hydraulic displacement and discharge from the filter. The central influent of material to be treated and the peripheral effluent zone provide uniform circulation and distribution of solids, thus avoiding short-circuiting or channeling problems.

The disinfection operation could involve any one of several processes or a combination. A high intensity, short wave, ultra-violet source 132a could be installed directly above each overflow weir with the water flowing uniformly over the weir in a thin sheet. The water would stay in the trough 114a until the level was high enough for discharge by an automatic siphon valve or float actuated pump, not shown.

A longer ultra-violet exposure could be obtained by flowing the water from the weir trough into a peripheral trough. The water flow would travel around the entire circumference of the tank and a greater volume of water would be retained for a longer period of time. Additional ultra-violet lamps would be positioned above the peripheral trough.

The discharge from the weir trough would flow into a contact tank 98a for exposure to chlorine or potassium permanganate. The chlorine feeder is a porous wick inserted inside a small plastic tube to provide resistance to flow and capillary action without evaporation. One end of the tube and wick is inserted, gas-tight, into a plastic bottle of chlorine solution. The bottle is positioned close to a heat source, such as the compressor motor, so that the heat therefrom can be utilized to raise the vapor pressure of the chlorine solution and force a very small quantity of vapor through the wick. The exposed tip of the wick is inserted in tube 116a below the liquid surface. The prior art drip mechanism or metering pump is subject to clogging and uses more chlorine than is necessary, even with the smallest adjustment. While it is doubtful that E-coli bacteria could survive the relatively low temperature and high aeration rate of the cone baffles, the ravenous protozoa in the filter 128a and the relatively long retention time in a completely alien environment, the disinfection process is necessary to render the effluent potable.

The sewage plant of this invention can be buried or installed in the crawl space or basement of a standard residence or commercial building. The tank could be closed as by means of top 52a and vented through the influent pipe 56a. The effluent may be used to water a lawn or re-used as a secondary water supply to flush toilets, equipment cooling functions or wasted in a storm drain. The plant could be incorporated into a fish pond for a botanical or hydroponic garden. The microbes would serve as fish food and the effluent disposed of by plant transpiration. An outdoor application would normally accelerate the growth of algae due to photosynthesis and might have to be removed periodically; however, inherent design features limit the growth of algae. The high ratio of microbes to organic matter and the continuous aeration removes over 90 percent of the phosphates which are the food supply for algae. A moderate algae growth is desirable because it absorbs carbon dioxide and evolves oxygen. The algae also assists in the chemical decomposition of complex compounds. Winter freezing and slow down of biological activity is eliminated by covering the pond with a transparent plastic bubble inflated by spent air used for aeration.

About 80 percent of the material treated is organic matter and is converted to carbon dioxide and water in the plant. The balance is inorganic matter which is found in the skeletal structure of organisms in the filter 128a which ultimately passes off in the effluent and grit and mineral salts which accumulate in a very small amount on the floor of the tank.

Where removal of accumulated solids from the bottom of tank 12a is required, this may be accomplished via the bottom drain 20a and pipe 34a. Pipe 34a serves to establish liquid level 67a.

What is claimed is:

1. Apparatus for providing combined mixing of gas with and circulatory movement of liquid within a body of liquid, said apparatus comprising:

means confining the body of liquid having an inlet and an outlet;

means adapted to establish a normal liquid level within said liquid confining means;

wall means circumscribing and forming within said liquid body confining means a passage for cyclic fluid flow zone defining an upflow and a downflow passage for the circulation of liquid, said flow zone being open at its upper and lower ends;

said wall means extending above the level of the liquid and preventing discharge from the upflow passage to other than the open upper end of the downflow passage; and gas distributing means positioned adjacent the lower end of said upflow passage for introducing a gas substantially uniformly into the open lower end of said upflow passage to create an upwardly directed liquid lifting action therein and thereby to set up cyclic circulation of the liquid in the fluid flow zone.

2. Apparatus according to claim 1 wherein the fluid flow zone defined by said wall means is of decreasing cross sectional area in progressing from the lower end thereof to the upper end thereof.

3. Apparatus according to claim 1 which includes a tank confining the body of liquid having an inlet and an outlet, wherein said inlet includes means positioned and adapted to introduce incoming matter into the body of liquid at the upper end of the downflow passage.

4. Apparatus according to claim 1 which includes a tank confining the body of liquid having an inlet and an outlet, wherein an outlet flow passage is defined by said tank and said wall means and filter means is positioned in said outlet flow passage below the normal liquid level.

5. Apparatus according to claim 1 which includes a tank confining the body of liquid having an inlet and an outlet which includes liquid level control means positioned and adapted to control the liquid level within said tank to a predetermined level.

6. Apparatus according to claim 1 which includes a tank confining the body of liquid having an inlet and an outlet, wherein the tank has a sloped bottom which is sloped downwardly from the periphery thereof.

7. Apparatus according to claim 4 wherein said tank includes liquid level control means positioned and adapted to control the liquid level within said tank to a predetermined level.

8. Apparatus according to claim 4 wherein sterilizer means is positioned and adapted to sterilize the liquid effluent issuing from said tank.

9. Apparatus for the treatment of a confined body of liquid comprising:

means confining the body of liquid having an inlet and an outlet;

means adapted to establish a normal liquid level within said liquid confining means;

baffle means having walls with inclined wall portions located in spaced opposed relation and positioned in the liquid body confining means, said walls extending from an upper extremity located above the normal liquid level to a lower extremity located below the normal liquid level and defining openings between said walls at the top and bottom extremities communicating a downflow liquid passage therebetween;

said baffle means further defining an upflow liquid passage immediately adjacent the underneath side of the inclined wall portion; and gas distribution means positioned and adapted to substantially uniformly introduce a gas into the upflow liquid passage near the lower extremities thereof to produce an upwardly directed liquid pumping action beneath the inclined wall portion.

10. Apparatus according to claim 9 wherein the upflow passage defined by said baffle means is of decreasing cross sectional area in progressing from the lower end of the passage to the upper end thereof.

11. Apparatus according to claim 9 which includes a tank confining the body of liquid having an inlet and an outlet, wherein said inlet includes means positioned and adapted to introduce incoming matter into the body of liquid at the upper end of the downflow passage defined by said baffle means.

12. Apparatus according to claim 9 which includes a tank confining the body of liquid having an inlet and an outlet, wherein an outlet flow passage is defined by said tank and said baffle means and filter means is positioned in said outlet flow passage below the normal liquid level.

13. Apparatus according to claim 9 which includes a tank confining the body of liquid having an inlet and an outlet which includes liquid level control means positioned and adapted to control the liquid level within said tank to a predetermined level.

14. Apparatus according to claim 10 which includes a tank confining the body of liquid having an inlet and an outlet, wherein the tank has a sloped bottom which is sloped downwardly from the periphery thereof toward the center with the sloped portion extending inside the lower extremity of said baffle means.

15. Apparatus according to claim 12 wherein said tank includes liquid level control means positioned and adapted to control the liquid level within said tank to a predetermined level.

16. Apparatus according to claim 12 wherein sterilizer means is positioned and adapted to sterilize the liquid effluent issuing from said tank.

17. A sewage treatment plant comprised of:

a tank having a bottom and side walls and an inlet;

an inclined baffle means having an undercut portion extending from near the juncture of the bottom and side walls of the tank inwardly and upwardly terminating above the normal liquid level of the tank and defining a centrally positioned opening therein at the top and bottom extremities;

air distribution means positioned and adapted to uniformly introduce air peripherally into the space under the undercut portion near the lower extremities thereof;

air supply means connected to said air distribution means to supply air under pressure thereto;

outlet means in said tank;

liquid level control means positioned in said outlet means to control the normal overflow level of liquid in the tank; and filter means extending between the inclined baffle and the side wall of the tank and positioned adjacent to and below the normal liquid level in the tank.

18. The sewage treating plant according to claim 17 wherein said inclined baffle means is a concentrically positioned truncated cone.

19. The sewage treating plant according to claim 17 wherein the inclined baffle means is provided with at least one annular opening therein spaced from the bottom extremity thereof and an air distribution means positioned and adapted to discharge air under pressure through said opening into the space defined by said undercut portion.

20. The sewage treating plant according to claim 17 including a pair of upstanding spaced walls interconnecting the baffle means and a side wall of said tank and having a bottom wall interconnecting the lower extremities of said baffle, said upstanding walls and side wall, together defining a final treating chamber with the upper extremities of the upstanding walls being above the normal liquid level in the tank.

21. The sewage treating plant according to claim 18 including an upstanding circular baffle positioned on the tank bottom in concentric relation to said baffle means.

22. The sewage treating plant according to claim 20 wherein the upper extremities of the upstanding walls of said final treating chamber are provided with weir openings having adjustable weir gates for selectively controlling the normal liquid level in said tank.

23. The sewage treating plant according to claim 22 wherein a weir trough is positioned between and connected to receive effluent from said weir openings, filter bed means positioned intermediate the top and bottom of the final treating chamber with a conduit having an inlet in said weir trough and an outlet positioned to discharge into the final treating chamber below said filter bed means.

24. The sewage treating plant according to claim 23 wherein the final treating chamber contains sterilizing means for sterilizing the fluid contents passing therethrough.

25. The sewage treating plant according to claim 17 wherein the air distribution means comprises a manifold positioned about the lower periphery of said baffle which includes a plurality of air nozzles at spaced intervals therealong.

26. The sewage treating plant according to claim 25 wherein the air nozzles comprise a plurality of bolts threadedly received in said manifold and provided with a longitudinal slit to provide for egress of the air.

* * * * *